(12) United States Patent
Walsem et al.

(10) Patent No.: US 7,713,720 B2
(45) Date of Patent: May 11, 2010

(54) POLYMER EXTRACTION METHODS

(75) Inventors: Johan Van Walsem, Acton, MA (US);
Luhua Zhong, Woburn, MA (US);
Simon S. Shih, Cambridge, MA (US)

(73) Assignee: Metabolix Inc., Cambridge, MA (US)

( * ) Notice: Subject to any disclaimer, the term of this patent is extended or adjusted under 35 U.S.C. 154(b) by 216 days.

(21) Appl. No.: 11/772,574

(22) Filed: Jul. 2, 2007

(65) Prior Publication Data

US 2007/0278157 A1 Dec. 6, 2007

Related U.S. Application Data

(62) Division of application No. 10/625,861, filed on Jul. 23, 2003, now Pat. No. 7,252,980.

(60) Provisional application No. 60/401,498, filed on Aug. 6, 2002, provisional application No. 60/428,963, filed on Nov. 25, 2002.

(51) Int. Cl.
*C12P 7/62* (2006.01)
*B01D 11/02* (2006.01)
*B01D 21/00* (2006.01)
*C12Q 1/68* (2006.01)

(52) U.S. Cl. ............ 435/135; 210/702; 210/770; 210/773; 435/6; 435/7.1

(58) Field of Classification Search ............ None
See application file for complete search history.

(56) References Cited

U.S. PATENT DOCUMENTS

| | | | |
|---|---|---|---|
| 4,562,245 A | 12/1985 | Stageman et al. | |
| 4,968,611 A | 11/1990 | Traussnig et al. | |
| 5,213,976 A | 5/1993 | Blauhut et al. | |
| 5,536,419 A * | 7/1996 | Escalona et al. | ............ 210/767 |
| 5,821,299 A | 10/1998 | Noda | |
| 5,894,062 A | 4/1999 | Liddell | |
| 5,942,597 A * | 8/1999 | Noda et al. | ............ 528/361 |
| 6,043,063 A | 3/2000 | Kurdikar et al. | |
| 6,083,729 A | 7/2000 | Martin et al. | |
| 6,087,471 A | 7/2000 | Kurdikar et al. | |
| 6,111,006 A | 8/2000 | Waddington | |
| 6,228,934 B1 | 5/2001 | Horowitz et al. | |
| 6,340,580 B1 | 1/2002 | Horowitz | |
| 6,709,848 B1 | 3/2004 | Martin et al. | |
| 7,252,980 B2 * | 8/2007 | Walsem et al. | ............ 435/135 |
| 2002/0058316 A1 | 5/2002 | Horowitz | |
| 2002/0156128 A1 * | 10/2002 | Williams et al. | ............ 514/547 |

FOREIGN PATENT DOCUMENTS

| | | |
|---|---|---|
| BR | PI 9302312-0 A | 7/1995 |
| CA | 2234965 | 5/1997 |
| WO | WO 98/46782 | 10/1998 |
| WO | WO 01/68890 A2 | 9/2001 |

OTHER PUBLICATIONS

English translation of Official Action issued in Japanese Patent Application No. 2004-526138 mailed Jun. 11, 2009.
Office Action for Canadian Patent Application No. 2,494,322 dated Oct. 15, 2009.
Third Office Action for Chinese Patent Application No. 200480042224.3 issued Dec. 4, 2009.
Final Office Action for U.S. Appl. No. 10/783,995 mailed Jan. 26, 2010.

* cited by examiner

*Primary Examiner*—Herbert J. Lilling
(74) *Attorney, Agent, or Firm*—Foley & Lardner LLP

(57) ABSTRACT

Polymer extraction methods are disclosed.

26 Claims, 3 Drawing Sheets

POLYMER EXTRACTION METHODS

CROSS-REFERENCE TO RELATED PATENT APPLICATIONS

This application is a divisional of and claims priority under 35 U.S.C. §120 to U.S. patent application Ser. No. 10/625,861, filed Jul. 23, 2003, and entitled 5 "Polymer Extraction Methods," now U.S. Pat. No. 7,252,980, which in turn claims priority under 35 U.S.C. §119 to U.S. Provisional Patent Application Ser. No. 60/401,498, filed Aug. 6, 2002, and entitled "Polymer Extraction Methods," and U.S. Provisional Patent Application Ser. No. 60/428,963, filed Nov. 25, 2002, and entitled "Polymer Extraction Methods." The entire contents of the parent applications are hereby incorporated by reference.

TECHNICAL FIELD

The invention relates to polymer extraction methods.

BACKGROUND

A polyhydroxyalkanoate ("PHA") can be extracted from biomass having cells that contain the PHA. Generally, this process involves combining the biomass with a solvent for the PHA, followed by heating and agitation. Typically, this provides a system including two phases, with one phase being a solution that contains the solvent and the PHA, and the other phase containing residual biomass with cells containing a reduced amount of the PHA. Usually, the two phases are separated, and the PHA is then removed from the solvent.

SUMMARY

In general, the invention relates to polymer extraction methods.

In one aspect, the invention features a method of separating a polymer from a biomass containing the polymer. The method includes contacting the biomass with a solvent system to provide a residual biomass and a solution. The solvent system includes a solvent for the polymer and a precipitant for the polymer, and the solution includes the polymer, the solvent for the polymer and the precipitant for the polymer. The method also includes applying a centrifugal force to the solution and residual biomass to separate at least some of the solution from the residual biomass.

In another aspect, the invention features a method of separating a polymer from biomass containing the polymer. The method includes contacting the biomass with a solvent system to provide a residual biomass and a solution including the polymer and the solvent system, and separating at least some of the solution from the residual biomass. The method also includes adding a precipitant for the polymer to the solution to remove at least some of the polymer from the solvent system.

In a further aspect, the invention features a method of separating a polymer from biomass containing the polymer. The method includes contacting the biomass with a solvent system to provide a residual biomass and a solution that includes the polymer and the solvent system. The solution has a polymer concentration of at least about two percent and a viscosity of at most about 100 centipoise. The method also includes separating at least some of the solution from the residual biomass.

In one aspect, the invention features a method of separating a polymer from biomass containing the polymer. The method includes contacting the biomass with a solvent system to provide a residual biomass and a solution. The solvent system includes a solvent for the polymer, and the solution includes the polymer and the solvent for the polymer. The solvent for the polymer may have a boiling point greater than 100° C. The method also includes separating the polymer from the residual biomass.

In another aspect, the invention features a method of separating a polymer from biomass containing the polymer. The method includes contacting the biomass with a volume of a solvent system to provide a residual biomass and a solution including the polymer and the solvent for the polymer, and separating at least some of the solution from the residual biomass. The method also includes adding a volume of a precipitant for the polymer to the separated solution to remove at least some of the polymer from the solution. The volume of the precipitant added is less than about two parts relative to the volume of the solvent system.

In a further aspect, the invention features a method of separating a polymer from a biomass containing the polymer and biomass impurities. The method includes contacting the biomass with a precipitant for the polymer to remove at least some of the biomass impurities from the biomass containing the polymer and the biomass impurities, thereby providing a purified biomass containing the polymer. The method also includes contacting the purified biomass with a solvent system to provide a residual biomass and a solution including the polymer and the solvent for the polymer.

In another aspect, the invention features a method of separating a polymer from the biomass containing the polymer and biomass impurities. The method includes pre-treating the biomass chemically to remove at least some of the biomass impurities from the biomass containing the biomass and the impurities, thereby providing a purified biomass containing the polymer. The chemical treatments include manipulation of pH, temperature and contact time with or without the presence of additional chemicals such as surfactants, detergents, enzymes or similar materials that can aid removal of the biomass impurities. The method also includes contacting the purified biomass with a solvent system to provide a residual biomass and a solution including the polymer and the solvent for the polymer.

In one aspect, the invention features a method of separating a polymer from a biomass containing the polymer. The method includes contacting the biomass with a solvent system under countercurrent flow conditions.

In another aspect, the invention features a method of separating a polymer from a biomass containing the polymer. The method includes contacting the biomass with a solvent system using a one-stage process that forms a PHA phase and a residual biomass phase. The ratio of volume of the solvent system present in the PHA phase to volume of the solvent system contacted with the biomass is at least about 0.8.

In a further aspect, the invention features a method of separating a polymer from a biomass containing the polymer. The method includes contacting the biomass with a solvent system using a one-stage process that forms a PHA phase and a residual biomass phase. The ratio of volume of the solvent system present in the residual biomass phase to volume of the solvent system contacted with the biomass is at most about 0.2.

In certain embodiments, the methods can extract polymer (e.g., PHA) from biomass in relatively high yield. In some embodiments, a relatively high yield of polymer (e.g., PHA) can be extracted from biomass without using multiple stages (e.g., with a one-stage process).

In some embodiments, the methods can extract relatively pure polymer (e.g., PHA).

In certain embodiments, the methods can use solvent(s) and/or precipitant(s) in a relatively efficient manner. For example, a relatively high percentage of the solvent(s) and/or precipitant(s) used in the methods can be recovered (e.g., for re-use).

In some embodiments, the methods can have a reduced environmental impact.

In certain embodiments, the methods can extract the polymer at relatively high space velocity (e.g. at high throughput with overall low residence time in process equipment).

In certain embodiments, the methods can result in a relatively small amount of undesirable reaction side products (e.g., organic acids). This can, for example, decrease the likelihood of corrosion or other undesirable damage to systems used in the methods and/or extend the useful lifetime of such systems.

In some embodiments, the methods can provide relatively high volumetric throughput (e.g., by using a one-stage process).

In certain embodiments, the methods can provide relatively high solvent recovery.

In certain embodiments, the process can be performed with one-stage device (e.g., a countercurrent centrifugal contacter).

In some embodiments, a relatively low viscosity residual biomass is formed (e.g., using countercurrent conditions), which can enhance subsequent processing such as stripping of residual solvent and concentration of the solids content (e.g. by evaporation, filtration or drying).

Features, objects and advantages of the invention are in the description, drawings and claims.

DETAILED DESCRIPTION

Figure 1:
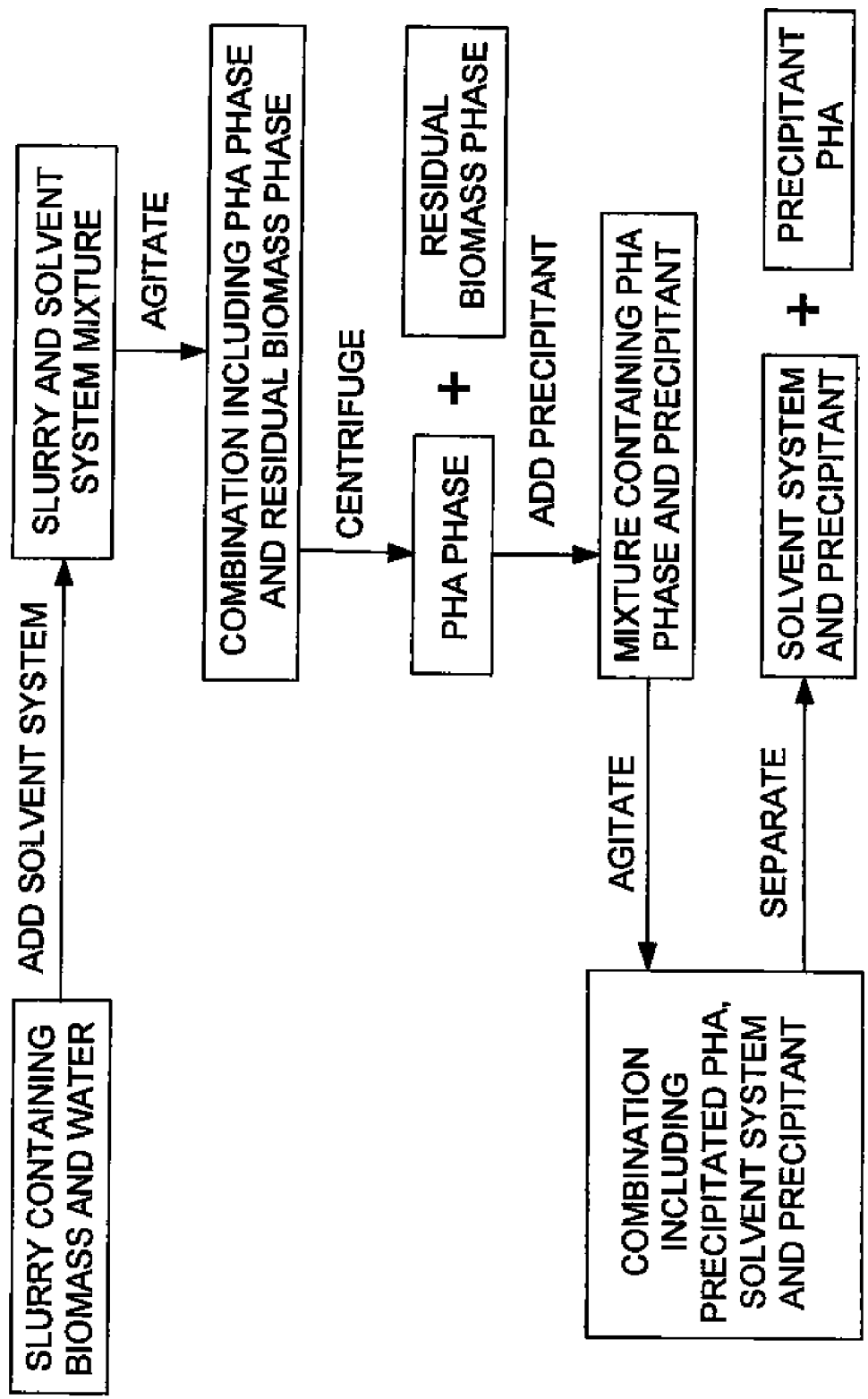
FIG. 1 is a flow diagram of an embodiment of a method of extracting PHA from a biomass with cells containing PHA.

FIG. 1 is a flow diagram of an embodiment of a process for extracting a PHA from biomass having cells that contain the PHA. A slurry is provided that contains the biomass and water. A solvent system is added to the slurry to form a mixture that contains the slurry and the solvent system. The mixture is agitated (e.g., stirred) to provide a combination that includes two phases. One phase is formed of a solution containing the PHA and the solvent system with trace amounts of biomass ("the PHA phase"). The second phase is formed of residual biomass having cells with reduced polymer content, water and a carry over portion of the solvent system ("the residual biomass phase"). The two phases included in the combination are separated using an appropriate device that exploits centrifugal force to facilitate the separation (e.g. disc centrifuge, bowl centrifuge, decanter centrifuge, hydroclone, countercurrent centrifugal contacter). Optionally, one or more solvents can be added to the device that exploits centrifugal force to facilitate the separation. A precipitant for the PHA is added to the PHA phase to form a mixture that contains the PHA phase and the precipitant. The mixture is agitated (e.g., stirred) to form a combination that contains precipitated PHA, the solvent system and the precipitant. In certain embodiments, the solvent system and the precipitant are miscible which results in the combination (precipitated PHA, solvent system and precipitant) having two phases (e.g., one phase containing the precipitated PHA, and one phase containing the solvent system and precipitant). The combination (precipitated PHA, solvent system and precipitant) is separated (e.g., by filtration or using centrifugal force) to provide the isolated, extracted PHA.

The process in FIG. 1 can be referred to as a one-stage process. In general, a one-stage process is a process in which only one centrifugation step is used during separation of the polymer (e.g., PHA) from the biomass. In general, a multi-stage process refers to a process in which more than one centrifugation step is used during separation of the polymer (e.g., PHA) from the biomass (see additional discussion below). For example, the residual biomass formed in the process in FIG. 1 can be treated and ultimately centrifuged, thereby creating a two-stage process (see, for example, FIG. 2 and discussion below).

In some embodiments, the process results in a relatively high yield of the PHA. For example, in some embodiments a ratio of the dry weight of extracted PHA to the dry weight of the PHA initially contained in the biomass is at least about 0.9 (e.g., at least about 0.95, at least about 0.97, at least about 0.98). In certain embodiments, a relatively high yield of PHA can be achieved without using a multi-stage process (e.g., with a one-stage process).

In certain embodiments, the process can be performed with relatively large amount of the solvent being transferred to the PHA phase. For example, in some embodiments a ratio of the volume of solvent recovered in the PHA phase to the volume of solvent contacted with the biomass is at least about 0.8 (e.g., 0.85, at least about 0.9, at least about 0.95, at least about 0.98, at least about 0.99). In some embodiments, a relatively large amount of solvent can be transferred to the PHA phase using, for example, countercurrent conditions during separation of the polymer (e.g., PHA) from the biomass.

In certain embodiments, the process can be performed with a relatively small amount of the solvent being transferred to the residual biomass phase. For example, in some embodiments a ratio of the volume of solvent recovered in the residual biomass phase to the volume of solvent contacted with the biomass is at most about 0.2 (e.g., at most about 0.15, at most about 0.1, at most about 0.05, at most about 0.02, at most about 0.01). In some embodiments, a relatively small amount of the solvent is transferred to the residual biomass phase using, for example, countercurrent conditions during separation of the polymer (e.g., PHA) from the biomass.

The slurry can be provided in any desired manner. Typically, the slurry is provided by forming a fermentation broth containing water and the biomass, and removing a portion of the water from the fermentation broth. The water can be removed, for example, by filtration (e.g., microfiltration, membrane filtration) and/or by decanting and/or by using centrifugal force. In certain embodiments, biomass impurities, such as cell wall and cell membrane impurities, can be removed during the process of providing the slurry. Such impurities can include proteins, lipids (e.g., triglycerides, phospholipids, and lipoproteins) and lipopolysaccharides.

The PHA content of the biomass (e.g., PHA content of the dry biomass, inclusive of its polymer content, on a weight percent basis) can be varied as desired. As an example, in embodiments in which the biomass is of microbial origin, the biomass can have a PHA content of at least about 50 weight percent (e.g., at least about 60 weight percent, at least about 70 weight percent, at least about 80 weight percent). As another example, in embodiments in which the biomass is of plant origin, the biomass can have a PHA content of less than about 50 weight percent (e.g., less than about 40 weight percent, less than about 30 weight percent, less than about 20 weight percent).

In some embodiments, the slurry has a solids content (e.g., dry biomass, inclusive of its PHA content, weight relative to total wet weight of slurry) of from about 25 weight percent to about 40 weight percent (e.g., from about 25 weight percent to about 35 weight percent).

The biomass can be formed of one or more of a variety of entities. Such entities include, for example, microbial strains for producing PHAs (e.g., *Alcaligenes eutrophus* (renamed as *Ralstonia eutropha*), *Alcaligenes latus, Azotobacter, Aeromonas, Comamonas, Pseudomonads*), genetically engineered organisms for producing PHAs (e.g., *Pseudomonas, Ralstonia, Escherichia coli, Klebsiella*), yeasts for producing PHAs, and plant systems for producing PHAs. Such entities are disclosed, for example, in Lee, *Biotechnology & Bioengineering* 49:1-14 (1996); Braunegg et al., (1998), J. Biotechnology 65: 127-161; Madison and Huisman, 1999; and Snell and Peoples 2002, Metabolic Engineering 4: 29-40, which are hereby incorporated by reference.

In embodiments in which the biomass contains microbial cells, the size of the microbial cells contained in the biomass can also be varied as desired. In general, the microbial cells (e.g., bacterial cells) have at least one dimension with a size of at least about 0.2 micron (e.g., at least about 0.5 micron, at least about one micron, at least about two microns, at least about three microns, at least about four microns, at least about five microns). In certain embodiments, using relatively large microbial cells (e.g., relatively large bacterial cells) in the biomass can be advantageous because it can facilitate the separation of the biomass to form the biomass slurry.

In general, a PHA is formed by polymerization (e.g., enzymatic polymerization) of one or more monomer units. Examples of such monomer units include, for example, 3-hydroxybutyrate, 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate, 3-hydroxytetradecanoate, 3-hydroxyhexadecanoate, 3-hydroxyoctadecanoate, 4-hydroxybutyrate, 4-hydroxyvalerate, 5-hydroxyvalerate, and 6-hydroxyhexanoate.

In some embodiments, the PHA has at least one monomer unit with the chemical formula —$OCR_1R_2(CR_3R_4)_nCO$—. n is zero or an integer (e.g., one, two, three, four, five, six, seven, eight, nine, 10, 11, 12, 13, 14, 15, etc.). Each of $R_1$, $R_2$, $R_3$ and $R_4$ is a hydrogen atom, a saturated hydrocarbon radical, an unsaturated hydrocarbon radical, a substituted radical (e.g., a substituted hydrocarbon radical) or an unsubstituted radical (e.g., an unsubstituted hydrocarbon radical). Examples of substituted radicals include halo-substituted radicals (e.g., halo substituted hydrocarbon radicals), hydroxy-substituted radicals (e.g., hydroxy-substituted hydrocarbon radicals), halogen radicals, nitrogen-substituted radicals (e.g., nitrogen-substituted hydrocarbon radicals) and oxygen-substituted radicals (e.g., oxygen-substituted hydrocarbon radicals). Substituted radicals include, for example, substituted, saturated hydrocarbon radicals and substituted, unsaturated hydrocarbon radicals. $R_1$ is the same as or different from each of $R_2$, $R_3$ and $R_4$. $R_2$ is the same as or different from each of $R_1$, $R_3$ and $R_4$. $R_3$ is the same as or different from each of $R_2$, $R_1$ and $R_4$, and $R_4$ is the same as or different from each of $R_2$, $R_3$ and $R_1$.

In some embodiments, the PHA is a copolymer that contains two or more different monomer units. Examples of such copolymers include poly-3-hydroxybutyrate-co-3-hydroxypropionate, poly-3-hydroxybutyrate-co-3-hydroxyvalerate, poly-3-hydroxybutyrate-co-3-hydroxyhexanoate, poly-3-hydroxybutyrate-co-4-hydroxybutyrate, poly-3-hydroxybutyrate-co-4-hydroxyvalerate, poly-3-hydroxybutyrate-co-6-hydroxyhexanoate, poly 3-hydroxybutyrate-co-3-hydroxyheptanoate, poly-3-hydroxybutyrate-co-3-hydroxyoctanoate, poly-3-hydroxybutyrate-co-3-hydroxydecanoate, poly-3-hydroxybutyrate-co-3-hydroxydodecanotate, poly-3-hydroxybutyrate-co-3-hydroxyoctanoate-co-3-hydroxydecanoate, poly-3-hydroxydecanoate-co-3-hydroxyoctanoate, and poly-3-hydroxybutyrate-co-3-hydroxyoctadecanoate.

In certain embodiments, the PHA is a homopolymer. Examples of such homopolymers include poly-4-hydroxybutyrate, poly-3-hydroxypropionate, poly-3-hydroxybutyrate, poly-3-hydroxyhexanoate, poly-3-hydroxyheptanoate, poly-3-hydroxyoctanoate, poly-3-hydroxydecanoate and poly-3-hydroxydodecanoate.

The PHA can have a polystyrene equivalent weight average molecular weight of at least about 500 (e.g., at least about 10,000, at least about 50,000) and/or less than about 2,000,000 (e.g., less than about 1,000,000, less than about 800,000).

In general, the amount of solvent system added to the slurry can be varied as desired. In certain embodiments, an amount of solvent system is added to the slurry so that, after centrifugation, the PHA phase has a PHA solids content of less than about 10 weight percent (e.g., less than about eight weight percent, less than about six weight percent, less than about five weight percent, less than about four weight percent, less than about three weight percent).

The solvent system includes one or more solvents for the PHA, and can optionally include one or more precipitants for the PHA. Without wishing to be bound by theory, it is believed that including a precipitant for the PHA in the solvent system can reduce the viscosity of the solution containing the polymer and the solvent system and/or enhance the selectivity of the process in extracting the desired PHA.

In general, a solvent for a given polymer is capable of dissolving the polymer to form a substantially uniform solution at the molecular or ionic size level. In general, a precipitant for a given polymer is capable of inducing the precipitation of the polymer and/or weakening the solvent power of a solvent for the polymer.

The choice of solvent(s) and/or precipitant(s) generally depends on the given PHA to be purified. Without wishing to be bound by theory, it is believed that an appropriate solvent for a given polymer can be selected by substantially matching appropriate solvation parameters (e.g., dispersive forces, hydrogen bonding forces and/or polarity) of the given polymer and solvent. Such solvation parameters are disclosed, for example, in Hansen, Solubility Parameters—A User's Handbook, CRC Press, NY, N.Y. (2000).

In certain embodiments in which the PHA is a poly-3-hydroxybutyrate copolymer (e.g., poly-3-hydroxybutyrate-co-3-hydroxypropionate, poly-3-hydroxybutyrate-co-3-hydroxyvalerate, poly-3-hydroxybutyrate-co-3-hydroxyhexanoate and/or poly-3-hydroxybutyrate-co-4-hydroxybutyrate, poly-3-hydroxybutyrate-co-3-hydroxyoctanoate-co-3-hydroxydecanote-co-3-hydroxydodecanote), where the majority of the monomer units are 3-hydroxybutyrate (e.g., at least about 50% of the monomer units are 3-hydroxybutyrate, at least about 60% of the monomer units are 3-hydroxybutyrate), the solvent(s) may be selected from ketones, esters and/or alcohols with at least four carbon atoms, and the precipitant(s) may be selected from alkanes, methanol and ethanol.

In some embodiments in which the PHA is poly-3-hydroxyoctanoate, the solvent(s) may be selected from ketones, esters, alcohols with at least four carbon atoms or alkanes (e.g., hexane).

In general, the ketones can be cyclic or acyclic, straight-chained or branched, and/or substituted or unsubstituted. Examples of acyclic ketones and cyclic ketones include methyl isobutyl ketone ("MIBK"), 3-methyl-2-pentanone (butyl methyl ketone), 4-methyl-2-pentanone(methyl isobutyl ketone), 3-methyl-2-butanone(methyl isopropyl ketone), 2-pentanone(methyl n-propyl ketone), diisobutyl ketone, 2-hexanone(methyl n-butyl ketone), 3-pentanone(diethyl ketone), 2-methyl-3-heptanone(butyl isopropyl ketone), 3-heptanone(ethyl n-butyl ketone), 2-octanone(methyl n-hexyl ketone), 5-methyl-3-heptanone(ethyl amyl ketone), 5-methyl-2-hexanone(methyl iso-amyl ketone), heptanone (pentyl methyl ketone), cyclo-pentanone, cyclo-hexanone.

In general, the esters can be cyclic or acyclic, straight-chained or branched, and/or substituted or unsubstituted. Examples of acyclic esters and cyclic esters include ethyl acetate, propyl acetate, butyl acetate, amyl acetate, butyl isobutyrate, methyl n-butyrate, butyl propionate, butyl butyrate, methyl valerate, ethyl valerate, methyl caproate, ethyl butyrate, ethyl acetate, gamma-butyrolactone, gamma-valerolactone.

In general, the alcohols having at least four carbon atoms can be cyclic or acyclic, straight-chained or branched, and/or substituted or unsubstituted. Examples of such cyclic alcohols and acyclic alcohols include methyl-1-butanol, ethyl-1-butanol, 3-methyl-1-butanol(amyl alcohol), 2-methyl-1-pentanol, 2-methyl-2-butanol(amyl alcohol), 3-methyl-2-pentanol(methyl iso-butyl carbinol), methyl-2-pentanol, 4-methyl-2-pentanol, butyl alcohol, pentyl alcohol, hexyl alcohol, heptyl alcohol, cyclo-hexanol, methyl-cyclo-hexanol and fusel oil (a mixture of higher alcohols, which is often a by-product of alcohol distillation, and typically is predominantly amyl alcohol (methyl butanol)).

In general, the alkanes can be cyclic or acyclic, straight-chained or branched, and/or substituted or unsubstituted. In some embodiments, the alkanes include straight-chain alkanes and have five or more carbon atoms (e.g., heptane, hexane, octane, nonane, dodecane). In certain embodiments the alkanes include isoalkanes (e.g. methyl heptane, methyl octane, dimethyl heptane). In certain embodiments, Soltrol® 100 (a mixture of C9-C11 isoalkanes, commercially available from Chevron Phillips Chemical Company located in Houston, Tex.) can be used.

Generally, the amount of solvent present in the solvent system can be varied as desired. In certain embodiments, the solvent system has at least about five parts (e.g., at least about 10 parts, at least about 15 parts) solvent per part PHA and/or less than about 50 parts (e.g., less than about 30 parts, less than about 25 parts) solvent per part PHA.

In some embodiments, a solvent for the PHA is non-halogenated. Using a non-halogenated solvent can be advantageous because this can reduce the negative environmental impact of the solvent, reduce the health risks associated with using the solvent, and/or reduce the costs associated with storing, handling and/or disposing the solvent.

In certain embodiments, a solvent for the PHA can have a relatively low density. For example, a solvent for the PHA can have a density of less than about 0.95 kilograms per liter (e.g., less than about 0.9 kilograms per liter, less than about 0.8 kilograms per liter, less than about 0.7 kilograms per liter) at 20° C. Without wishing to be bound by theory, it is believed that using a relatively low density solvent can enhance the quality of the separation of the PHA phase from the residual biomass phase.

In some embodiments, a solvent for the PHA has a relatively low solubility in water. For example, a solvent for the PHA can have a solubility in water of less than about one percent (e.g., less than about 0.5 percent, less than about 0.2 percent) at 20° C. A solvent with a relatively low solubility in water can be desirable because such a solvent is less likely to intermix with water. This can enhance the ease of providing two separate phases during the process, thereby reducing the cost and/or complexity of the process.

In certain embodiments, a solvent for the PHA is substantially non-hydrolyzable. For example, the solvent can be at most as hydrolyzable as ethyl acetate. Using a substantially non-hydrolyzable solvent can reduce the likelihood of undesirable side product formation (e.g., chemically reactive species, such as organic acids). This can reduce the amount and/or rate of, for example, corrosion of portions (e.g., plumbing) of the system in which the PHA extraction is performed.

In some embodiments, a solvent for the PHA is relatively easily stripped from water. For example, the solvent can have a log K value relative to water at 100° C. of at least about 1.5 (e.g., at least about 1.8, at least about two, at least about 2.2) as determined according to Hwang et al., Ind. Eng. Chem. Res., Vol. 31, No. 7, pp. 1753-1767 (1992), which is hereby incorporated by reference. Using a solvent that is readily stripped from water can be desirable because such a solvent can be more readily recovered and recycled relative to other solvents that are not as readily stripped from water.

In certain embodiments, a solvent for the PHA has a boiling point greater than 100° C.

In certain embodiments, an appropriate solvent is non-halogenated, has relatively low (e.g., less than ethyl acetate) water solubility, and relatively low reactivity from the perspective of hydrolysis and/or from the perspective of reactivity towards the polymer.

In some embodiments, the solubility of the PHA in the precipitant is less than about 0.2 percent (e.g., less than about 0.1 percent) of the PHA at 20° C.

In certain embodiments, a relatively small volume of precipitant is added to the PHA phase relative to the volume of solvent system added to the slurry. For example, the ratio of the volume of precipitant added to the PHA phase to the volume of solvent system added to the slurry is less than about 0.2 (e.g., less than about 0.1, less than about 0.07, less than about 0.05).

In embodiments in which the solvent system contains one or more solvents for PHA and one or more precipitants for PHA, the solvent(s) and the precipitant(s) can have a relative volatility of at least about two (e.g., at least about three, at least about four) at the equimolar bubble point of the solvent(s) and the precipitant(s) at atmospheric pressure.

In some embodiments in which the solvent system contains one or more solvents for the PHA and one or more precipitants for the PHA, the solvent(s) and the precipitant(s) do not form an azeotrope. Using solvent(s) and precipitant(s) that do not form an azeotrope can be desirable because it can be easier to separate and recover the solvent and precipitant for re-use relative to a solvent and precipitant that form an azeotrope.

In certain embodiments in which the solvent system contains a solvent for the PHA and a precipitant for the PHA, the solution formed of the PHA and the solvent system contains less than about 25 volume percent (e.g., less than about 20 volume percent, less than about 15 volume percent, less than about 10 volume percent) of the precipitant.

In general, the mixture containing the solvent system and the slurry is heated to enhance the interaction of the solvent system with the PHA, thereby allowing the PHA to be removed from the biomass.

In general, the temperature of the solvent system and slurry mixture during agitation can be varied as desired. In some embodiments, the temperature is less than about 160° C. (e.g., less than about 125° C., less than about 95° C., less than about 65° C.) and/or at least about 20° C. In certain embodiments, the temperature is from ambient temperature to about 95° C. (e.g., from about 40° C. to about 80° C., from about 60° C. to about 70° C.). In certain embodiments the pressure can be regulated to greater than atmospheric pressure to facilitate extraction at elevated temperature (e.g. greater than 1 atmosphere, up to 20 atmosphere).

Generally, the shear force used when agitating the solvent system and slurry mixture can be varied as desired. In certain embodiments, the solvent system and slurry mixture is agitated by stirring so that the dissolution time is reduced. In some embodiments, to assist dissolution, a high shear impeller and agitator (e.g. flat blade impeller such as the 6 bladed Rushton turbine) can be used at tip speeds of, for example, about five meters per second or more (e.g., to about 10 meters per second). In certain embodiments a high speed disperser having a low profile blade can be used at tip speeds of, for examples, about 10 meter per second or more (e.g. about 15 meter per second or more, about 20 meter per second to about 25 meter per second), Typically, the high speed dispersers have a blade with a low profile bladed or saw tooth edge to generate high shear at enhanced tip speeds. In certain embodiments, a rotor/stator system is used that generates relatively high shear (e.g., at tip speeds up to about 50 meters per second) in the gap between a high speed rotor that spins within a slotted stator. In general the geometry of the rotor and stator can be varied to suit particular applications and many designs are commercially available.

In general, the solvent system and slurry mixture is agitated until a centrifuged sample of the mixture has a PHA phase with a desired PHA solids content. In some embodiments, the solvent system and slurry mixture is agitated for less than about three hours (e.g., less than about two hours) and/or at least about one minute (e.g., at least about 10 minutes, at least about 30 minutes).

In certain embodiments, the PHA phase contains less than about 0.5 weight percent (e.g., less than about 0.25 weight percent, less than about 0.1 weight percent) biomass relative to the amount of dissolved PHA in the PHA phase.

In some embodiments, the biomass phase contains less than about 25 weight percent (e.g., less than about 20 weight percent, less than about 15 weight percent) of the solvent that was initially present in the solvent system and or at least about one weight percent (e.g., at least about five weight percent, at least about 10 weight percent) of the solvent that was initially present in the solvent system.

In some embodiments, the PHA phase has a relatively low viscosity. For example, this phase can have a viscosity of less than about 100 centipoise (e.g., less than about 75 centipoise, less than about 50 centipoise, less than about 40 centipoise, less than about 30 centipoise). Without wishing to be bound by theory, it is believed that preparing the PHA phase such that it has a relatively low viscosity can result in a relatively good separation of the PHA phase from the residual biomass phase. In particular, it is believed that the rate of separation of the phases during centrifugation is inversely proportional to the viscosity of the PHA phase so that, for a given centrifugation time, decreasing the viscosity of the PHA phase results in an improved separation of the phases relative to certain systems in which the PHA phase has a higher viscosity.

In certain embodiments, the PHA phase has a relatively high polymer concentration. For example, the PHA phase can have a polymer concentration of at least about two percent (e.g., at least about 2.5 percent, at least about three percent, at least about 3.5 percent, at least about four percent, at least about 4.5 percent, at least about five percent).

Various types of devices can be used that exploit centrifugal force. As an example, in some embodiments centrifugation is performed using a disc stack (e.g., a model SC-6, available from Westfalia Separator US, Inc., located in Northvale, N.J.). In certain embodiments centrifugation is performed using a decanter (e.g., a model CA-220, available from Westfalia Separator US, Inc., located in Northvale, N.J.). In some embodiments, a hydroclone can be used.

In certain embodiments a countercurrent centrifugal contacter (e.g., a Podbielniak centrifugal contacter, a Luwesta centrifugal contacter, Taylor-Couette centrifugal contacter) can be used. In general, a countercurrent centrifugal contacter is used by having two (or possibly more) fluid streams contact each other. One stream (the solvent stream) begins as a fluid stream that is relatively rich in solvent. Another stream (the biomass stream) begins as a fluid stream that is relatively rich in PHA. The two streams contact each other under countercurrent conditions such that a portion of the solvent stream that is richest in solvent contacts a portion of the biomass stream that is poorest in PHA (to enhance, e.g., optimize, the recovery of PHA from the biomass stream), and/or such that a portion of the biomass stream that is richest in PHA contacts a portion of the solvent stream that is most laden with PHA (to enhance, e.g., optimize, the concentration of PHA in the solvent stream). In certain embodiments, this is achieved by flowing the solvent stream reverse to the biomass stream (reverse flow conditions). Countercurrent centrifugal contacters are available from, for example, B&P Process Equipment (Saginaw, Mich.) and Quadronics. Examples of commercially available countercurrent centrifugal contacters include the Podbielniak A-1 countercurrent centrifugal contacter (B&P Process Equipment) and the Podbielniak B-10 countercurrent centrifugal contacter (B&P Process Equipment).

In general, the conditions (e.g., force, time) used for centrifugation can be varied as desired.

In some embodiments in which a disc stack is used, centrifugation can be performed using at least about 5,000 RCF (Relative Centrifugal Force) (e.g., at least about 6,000 RCF, at least about 7,000 RCF, at least about 8,000 RCF) and/or less than about 15,000 RCF (e.g., less than about 12,000 RCF, less than about 10,000 RCF). In certain embodiments in which a decanter is used, centrifugation can be performed using at least about 1,000 RCF (e.g., at least about 1,500 RCF, at least about 2,000 RCF, at least about 2,500 RCF) and/or less than about 5,000 RCF (e.g., less than about 4,000 RCF, less than about 3,500 RCF). In certain embodiments in which a countercurrent centrifugal contacter is used, centrifugation can be performed using at least about 1,000 RCF (e.g., at least about 1,500 RCF, at least about 2,000 RCF, at least about 2,500 RCF) and/or less than about 5,000 RCF (e.g., less than about 4,000 RCF, less than about 3,500 RCF).

In some embodiments in which a disc stack is used, centrifugation can be performed for less than about one hour (e.g., less than about 30 minutes, less than about 10 minutes, less than about five minutes, less than about one minute) and/or at least about 10 seconds (e.g., at least about 20 seconds, at least about 30 seconds). In certain embodiments in which a decanter is used, centrifugation can be performed for less than about one hour (e.g., less than about 30 minutes, less than about 10 minutes, less than about five minutes, less than about one minute) and/or at least about 10 seconds (e.g., at least about 20 seconds, at least about 30 seconds). In certain embodiments in which a countercurrent centrifugal contacter is used, centrifugation can be performed for less than about one hour (e.g., less than about 30 minutes, less than about 10 minutes, less than about five minutes, less than about one minute) and/or at least about 10 seconds (e.g., at least about 20 seconds, at least about 30 seconds).

After centrifugation, a precipitant for the PHA is added to the separated PHA phase to form a mixture. In embodiments in which the solvent system contains one or more precipitants for the PHA, the precipitant added to the separated PHA phase may be the same as or different from the precipitant(s) contained in the solvent system.

In general, the amount of the precipitant added to the separated PHA phase can be varied as desired. In some embodiments, the amount of precipitant added to the separated PHA phase is at least about 0.1 part (e.g., at least about 0.25 part, at least about 0.5 part) precipitant by volume relevant to the volume of solvent in the PHA phase and/or less than about two parts (e.g., less than about 1.5 parts, less than about one part, less than about 0.75 part) precipitant by volume relevant to the volume of solvent in the PHA phase.

The PHA phase/precipitant mixture is agitated to enhance the interaction of the PHA with the precipitant for the PHA. This allows the PHA to precipitate from the mixture, resulting in a combination formed of precipitated PHA and a mixture containing the solvent system and the added precipitant for the PHA. In general, agitation of the PHA phase/precipitant mixture is performed at room temperature, but other temperatures can be used if desired. In some embodiments, the PHA phase/precipitant mixture is mixed using high shear devices such as high shear impellers (e.g., a six-bladed Rushton turbine), high speed dispersers and rotor/stator high shear in-line or in-tank mixers. The shear rates are determined by the tip speeds of the various devices and can be varied between, for example, from about five meters per second to about 50 meters per second (e.g., from about 10 meters per second to about 25 meters per second). Without wishing to be bound by theory, it is believed that the high shear mixing can, under certain conditions, improve the quality of the precipitated polymer.

The precipitated PHA is then separated from the remaining liquid (e.g., solvent system and precipitant). This separation can be performed by, for example, filtration or centrifugation (e.g., using a basket centrifuge, using a vacuum belt filter).

Typically, the precipitated PHA is then washed to assist removing undesired impurities, such as remaining solvent and/or precipitant. In some embodiments, the polymer can be washed with solvent (e.g., relatively freshly prepared solvent), such as, for example, a mixture of the PHA solvent and the PHA precipitant (e.g., with any ratio between 0-100%). Usually, the composition for washing is selected to reduce (e.g., minimize) the re-dissolution of the polymer and/or to enhance (e.g., maximize) removal of impurities. In certain embodiments, the appropriate ratio can be dependent on the particular polymer composition and/or can be determined by standard experimentation (washing efficiency). In some embodiments this washing step can be conducted at elevated temperature and appropriate residence time to further facilitate the washing and removal of impurities Typically, the washed, precipitated PHA is dried (e.g., at a temperature of from about 40° C. to about 100 ° C.). Drying can be performed under vacuum (e.g., to assist in facilitating recovery of the residual solvent). In certain embodiments it may be desirable to directly extrude the precipitated polymer still containing solvent in, for example, a devolatilizing extruder. Such extrusion can be performed, for example, at a temperature close to the polymer melting point, and the solvent can be recovered directly from the extruder. Water can optionally be injected under pressure into the devolatilizing extruder (e.g., to generate steam in-situ to facilitate efficient stripping and removal of traces of residual solvent). A gas stream (e.g. air, $CO_2$ or steam) can optionally be injected into the extruder (e.g., to facilitate solvent removal). Extrusion can consolidate drying and product formation (e.g. pelletizing) operations into a single unit with, for example, capital and process operating cost savings.

The remaining liquid (solvent system and precipitant) can be further processed so that the components of the liquid (solvent(s) and/or precipitant(s)) can be re-used. For example, the liquid can be distilled to separate solvent from precipitant. In some embodiments, the separated solvent and/or precipitant can be re-used in the process described above (e.g., as a solvent in the solvent system, as a precipitant in the solvent system, as a precipitant added to the PHA phase). In certain embodiments, the separated solvent and/or precipitant can be re-used in the process described in FIG. 2 (see discussion below) (e.g., as a solvent in the solvent system, as a precipitant in the solvent system, as a precipitant added to the PHA phase).

In certain embodiments, the process (or portions of the process) can be performed in a continuous and/or an in-line manner. As an example, the process can involve an in-line rotor/stator process for dissolution, and/or an in-line rotor/stator process for precipitation of the PHA and/or an in-line devolatilizing extruder (e.g. a Werner and Pfleiderer ZSK extruder supplied by Coperion Corporation of Ramsey, N.J.) for removing the solvent and forming PHA solids (e.g. pellets).

In some embodiments, the process uses the solvent in a relatively efficient manner. For example, at least about 90 volume percent (e.g., at least about 95 volume percent, at least about 97 volume percent, at least about 98 volume percent) of the solvent initially used in the solvent is recovered for re-use.

In certain embodiments, the process uses the precipitant in a relatively efficient manner. For example, at least about 90 volume percent (e.g., at least about 95 volume percent, at least about 97 volume percent, at least about 98 volume percent) of the combined amount of precipitant initially used in the solvent and added to the PHA phase is recovered for re-use.

Figure 2:
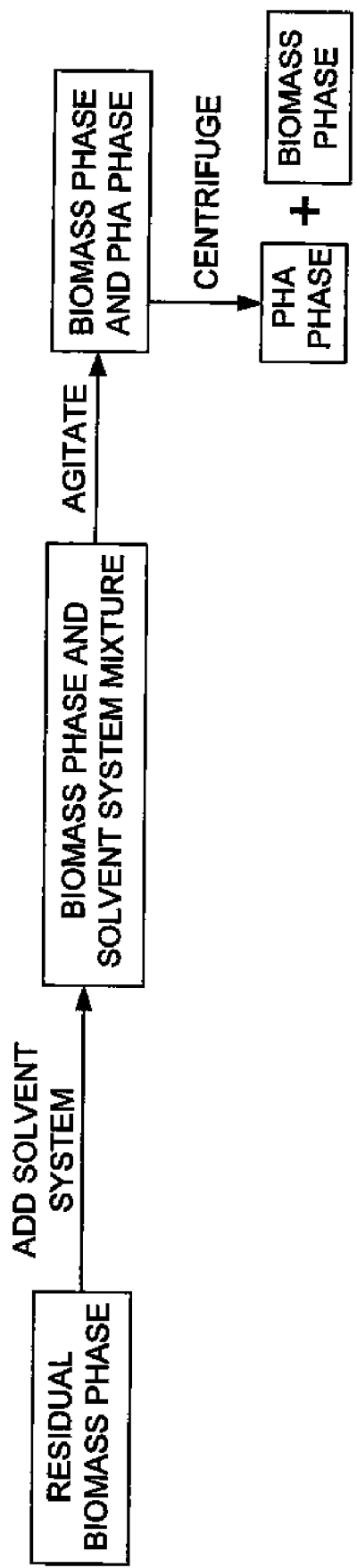
FIG. 2 is a flow diagram of a portion of an embodiment of a method of extracting PHA from a biomass with cells containing PHA.

FIG. 2 is a flow diagram showing an embodiment of a second stage of a two-stage process that can be used to enhance the efficiency of PHA extraction by extracting at least a portion of the PHA present in the residual biomass phase (FIG. 1). As shown in FIG. 2, a solvent system is added to the biomass phase to provide a mixture containing the biomass phase and the solvent system. The mixture is agitated (e.g., using the conditions described above with respect to agitation of the slurry and solvent system mixture) to provide a combination including a PHA phase (containing predominantly solvent system and PHA) and a biomass phase (containing predominantly biomass, water and carry-over solvent system). The PHA phase and biomass phase are separated using centrifugation (e.g., using the conditions described above with respect to centrifuging the PHA phase and biomass phase). The PHA phase can be treated as described above (e.g., by adding a precipitant for the PHA, agitating, separating, washing, drying), or the PHA phase can be added to the slurry and solvent mixture described above. The components of the solvent system (e.g., solvent(s) and/or precipitant(s))

can be stripped from the remaining biomass phase using standard techniques. The residual solvent contained in the biomass can be recovered through a variety of means such as steam stripping in a suitable column, a desolventizing drier (e.g. desolvantizer toaster used commonly in recovering residual solvent from soybean meal after oil extraction) or direct drying with solvent recovery (e.g. vacuum drier, fluid bed drier with inert gas circulation and solvent condensation). In some embodiments, the biomass containing the solvent can be co-dried with a compatible animal feed material (e.g., gluten feed, distiller dry grain, oil seed meal) in a drier that is suitably rated to handle and recover and/or safely eliminate (e.g. adsorption or incineration) the residual solvent. In the overall process in FIG. 2, the first stage is shown in FIG. 1, and the second stage is shown in FIG. 2. In certain embodiments, the residual biomass can be used as a nutrient for fermentation (e.g. ethanol fermentation using *Saccharomyces*), optionally after removing the residual solvent as described above. In some embodiments, the biomass can be hydrolyzed (e.g. by exposure to acidic conditions at elevated temperature, treatment with protease enzymes, lytic enzymes) to improve its nutrient profile for fermentation.

While certain methods for extracting a PHA from biomass have been described, other embodiments are also possible.

As an example, dry biomass can be used. In some embodiments, the dry biomass can be combined with water to provide a slurry.

As another example, a precipitant for the PHA can be added to the slurry before adding the solvent system. In some embodiments, the amount of precipitant added is at least about 0.5 volumes (e.g., from about 0.5 volumes to about two volumes) relative to the slurry.

Adding precipitant before adding the solvent system can result in the formation of a relatively pure isolated, extracted PHA (e.g., a purity of at least about 99%, a purity of at least about 99.5%, at purity of at least about 99.9%). The polymer purity can be determined by gas chromatography (GC) analysis (e.g., with a Hewlett Packard 5890 Series II GC equipped with Supelco 24044 SBP™-1 column of 30 m×0.32 mm ID with 0.25 μm film) following butanolysis of the polymer sample under acidic conditions to form butyl esters of the PHA monomeric units as well as the butyl esters of the lipids and phospholipids fatty acid residues. Suitable standards of the fatty acids and hydroxy acids (e.g. palmitic acid, stearic acid, oleic acid, linoleic acid and 3-hydroxy butyric acid) are used to calibrate and standardize and quantify the chromatographic response. This can be used to quantify both the polymer content as well as the impurity content. Inorganic impurities can be quantified by ashing.

Without wishing to be bound by theory, it is believed that adding a precipitant for the PHA to the slurry prior to adding the solvent system can assist in removing biomass impurities present in the biomass (e.g., phospholipids, neutral lipids, lipoproteins). This can be particularly advantageous if the PHA solids content in the biomass is relatively high (e.g., a PHA solids content of at least about 65%, at least about 75%).

As a further example, the biomass and/or the slurry can be chemically pre-treated for example with relatively mild caustic conditions (e.g., a pH of from about 8.5 to 10, from about 8.5 to about 9, from about 9 to about 9.5, from about 9.5 to about 10) followed by neutralization before adding the solvent system. This can result in the formation of a relatively pure isolated, extracted PHA (e.g., a purity of at least about 99%, at least about 99.5%). The caustic conditions can be prepared using one or more relatively basic materials, such as, for example, potassium hydroxide, sodium hydroxide and/or ammonium hydroxide.

As another example, the temperature can be elevated (e.g. any temperature between room temperature and about 95° C.) and other chemicals such as surfactants, detergents and/or enzymes added during the chemical pre-treatment step to further facilitate the formation of a relatively pure isolated, extracted PHA (e.g., a purity of at least about 99%, at least about 99.5%).

Without wishing to be bound by theory, it is believed that a chemical treatment (e.g., a relatively mild caustic treatment) of the slurry prior to adding the solvent system can assist in removing biomass impurities present in the biomass (e.g., lipids, phospholipids, lipoproteins). This can be particularly advantageous if the PHA solids content in the biomass is relatively high (e.g., a PHA solids content of at least about 65%, at least about 75%).

As another example, the methods can include concentration (e.g., evaporation) of the PHA phase after separation of this phase from the residual biomass phase but before addition of the precipitant for the PHA to the PHA phase. This can reduce the volume of solution, thereby reducing precipitant.

As a further example, in some embodiments the processes can be performed without adding a precipitant for the PHA to the PHA phase.

Moreover, the solvent system can be formed and then contacted with the biomass, or the biomass can be contacted with fewer than all the components of the solvent system, followed by subsequent addition of the remaining portion of the solvent system (e.g., in series or all at once). For example, in embodiments in which the solvent system includes a solvent for the PHA and a precipitant for the PHA, the slurry can be contacted with the solvent, followed by addition of the precipitant, or vice-versa. Alternatively, the solvent and precipitant can be combined to form the solvent system, followed by contacting the biomass.

Furthermore, while the extraction of a single PHA from a biomass has been described, the processes could be used to extract multiple PHAs (e.g., two, three, four, five, six) from a biomass. Such processes could involve the use of multiple solvents, precipitants and/or solvent systems.

In addition, while solvent systems containing a single solvent for the PHA and optionally a single precipitant for the PHA have been described, multiple solvents for the PHA (e.g., two, three, four, five, six) and/or multiple precipitants for the PHA (e.g., two, three, four, five, six) can be used.

As another example, in some embodiments the slurry/solvent system mixture can be agitated without heating. Alternatively the slurry/solvent system mixture can be agitated under pressure with heating.

As a further example, the methods can include distilling the solvent system/precipitant mixture formed (e.g., distilled) to separate the components (e.g., solvent for the PHA, precipitant for the PHA) so that one or more of the components can be re-used.

The following examples are illustrative and not intended to be limiting. In the examples, the chemicals were from Aldrich Chemical Co. Inc. (Milwaukee, Wis.), the overhead stirrer was an Ika®-werke Eurostar power control-visc overhead stirrer (Ika Work Inc., Wilmington, N.C.), and the centrifuge was a Sorvall RC 5B plus centrifuge.

EXAMPLE I

A batch of *Escherichia coli* biomass slurry containing 70% polymer on a dry basis with a composition of polyhydroxybutyrate co 4-hydroxybutyrate with 25% 4-hydroxybutyrate was split three ways and treated as follows:
 a. Spray dried and 30 g of dry biomass collected.
 b. Spray dried, 30 g of biomass collected and re-wetted with deionized (DI) water to 100 g.
 c. 100 g of original slurry containing 30 g of dry biomass without modification.

Each batch was extracted with 400 ml butyl acetate at room temperature with overhead stirring at 500 rpm for 2 hours. The resulting slurry was centrifuged at 5000 g for 20 minutes and the PHA phase recovered. The PHA content was determined by precipitation of the PHA from the PHA phase using hexane as precipitant followed by drying overnight under vacuum of one millimeter Hg and 40° C. The recovered polymer represented 32% dissolution of the starting polymer (approach 1), 43% of the starting polymer (approach 2), and greater than 97% dissolution of the starting polymer (approach 3).

EXAMPLE II

In a side by side test broth from an *Escherichia coli* fermentation containing cells with one dimension exceeding 2 microns was compared to *Ralstonia eutropha* containing cells with a maximum dimension of 0.5 micron. The time to obtain a clear supernatant was determined at 12000 rpm in an Eppendorf 5415C micro-centrifuge, using 1.5 mL centrifuge tubes filled with 1 mL of broth. In the case of the *E. coli* broth clear supernatant was obtained in less than 1 minute of centrifugation time while the *Ralstonia eutropha* required more than 5 minutes centrifugation for similar clarity.

EXAMPLE III

A polymer solution containing 5% polymer by weight (expressed relative to the total solution weight) was prepared by dissolving of *Escherichia coli* biomass slurry containing 70% polymer on a dry basis with a composition of polyhydroxybutyrate co 4-hydroxybutyrate with 25% 4-hydroxybutyrate in butyl acetate (Aldrich Chemical Co. Inc., Milwaukee, Wis.) using the procedure of Example Ic. The viscosity of the resulting solution was measured as 365 centiPoise (cP) using a Brookfield LVF Viscometer (Brookfield Engineering Laboratories Inc., Stoughton, Mass.). For solutions with viscosity less than 100 cP, a No. 1 spindle was used, and, for solutions with viscosity greater than 100 cP, a No. 2 spindle was used. The solution was further diluted with additional butyl acetate to 4% and 3% polymer by weight total solution. The resulting viscosities were found to be 150 cP and 40 cP, respectively.

Some of the 5% polymer solution in butyl acetate prepared above was subsequently diluted using hexane (Aldrich Chemical Co. Inc., Milwaukee, Wis.) to prepare a 4.5%, 4.3%, 4.1% and 3.9% solution by weight. The viscosities of these solutions were measured as described above and determined to be 215 cP, 37.5 cP, 5 cP and 27.5 cP, respectively.

Figure 3:
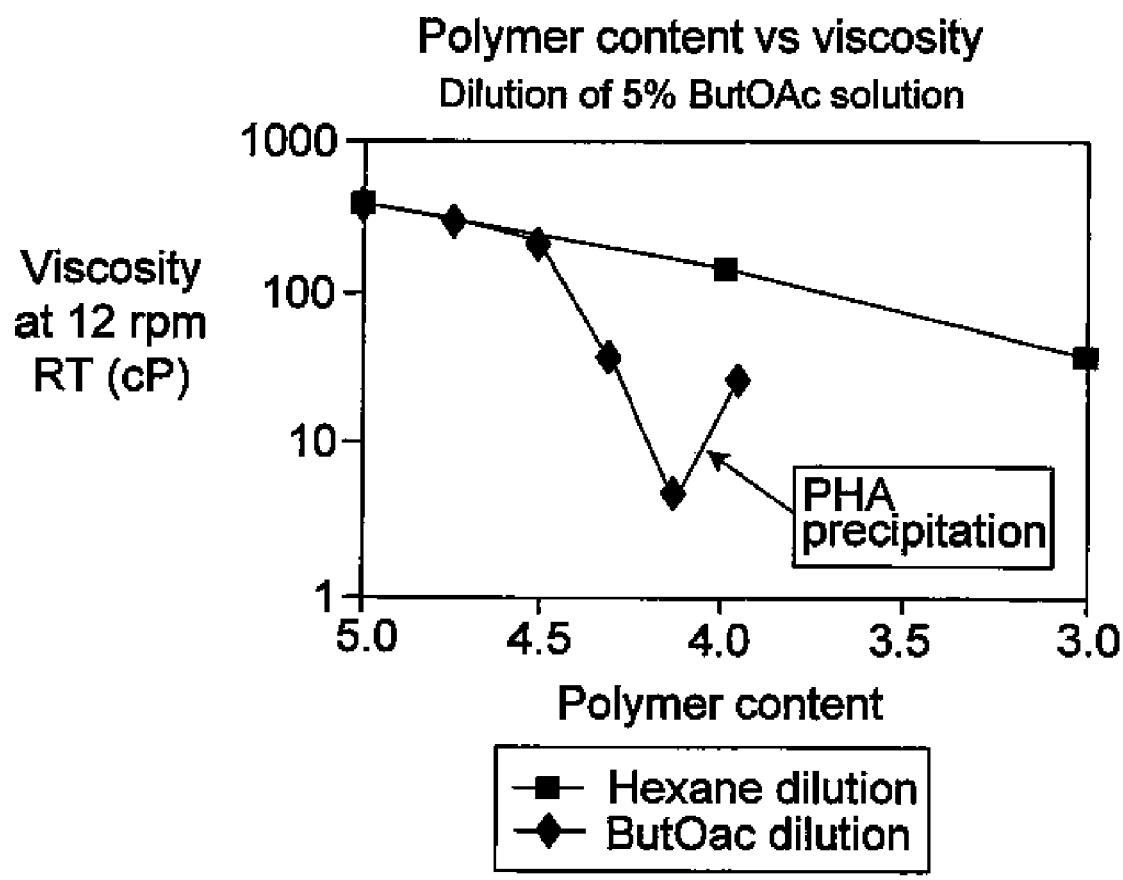
FIG. 3 is a graph showing viscosity and polymer content from Example III.

The viscosities upon dilution of a 5% polymer solution in butyl acetate with additional butyl acetate (PHA solvent) compared to dilution with hexane (PHA precipitant at room temperature) are depicted in FIG. 3. Dilution with the precipitant has a non-linear and desirable impact on reducing viscosity. The increased viscosity observed with hexane dilution to 3.9% by weight polymer in solution coincided with polymer precipitation from solution at that level of hexane addition.

EXAMPLE IV

A recombinant *E. coli* was used to produce poly 3-hydroxybutyrate-co-4-hydroxybutyrate (30% 4-hydroxybutyrate on a molar basis) in a fed-batch fermentation, using glucose as the major carbon source. At the completion of the fermentation the *E. coli* cells had expanded in size to greater than 2 microns in at least one dimension. The biomass accumulated 70% polymer on a dry weight basis. The biomass was subsequently harvested using centrifugation to produce a wet biomass pellet, substantially free of dissolved impurities.

100 g of the wet biomass pellet (48% dry solids) containing 70% poly 3-hydroxybutyrate co 4-hydroxybutyrate on a dry basis was charged with 500 ml of ethyl acetate and agitated with a overhead stirrer at room temperature for 1 hour. The polymer composition was 30% 4-hydroxybutyrate on a molar basis. The mixing time was terminated after the viscosity increased to the extent that further stirring was not effective in mixing the material. A total of 350 ml of the slurry was collected and centrifuged at 5000 g for a total of 20 minutes (Sorvall RC 5B plus centrifuge, Kendro Laboratory Products, Newtown Conn.). The theoretical amount of ethyl acetate that should be recoverable from the 350 mL of slurry was 300 mL according to mass balance calculations.

The PHA content of the PHA phase was about 5.3%. 220 milliliters of the PHA phase was recovered by decantation after centrifugation, constituting about 73% by volume of the total recoverable ethyl acetate of slurry prior to centrifugation.

EXAMPLE V

The preceding example was repeated, except butyl acetate (Aldrich Chemical Co. Inc., Milwaukee, Wis.) was used rather than ethyl acetate. The polymer in solution was about 4.3%. There was the appearance of an emulsified layer at the interface after centrifugation. 250 milliliters of the PHA phase was recovered by decantation after centrifugation, constituting about 83% of the total recoverable butyl acetate present in the slurry before centrifugation.

EXAMPLE VI

The preceding example was repeated, except MIBK (Aldrich Chemical Co. Inc., Milwaukee, Wis.) was used rather than butyl acetate. The polymer in solution was about 4.2%. 290 milliliters of the PHA phase was recovered by decantation after centrifugation, constituting about 97% of the total recoverable MIBK present in the slurry before centrifugation.

EXAMPLE VII 100 g of wet *E. coli* biomass paste with 28% dry solids containing 75% Poly 3-hydroxybutyrate co 4-hydroxybutyrate with 35% 4-hydroxybutyrate on a dry solids basis was contacted with 200 g of hexane (Aldrich Chemical Co. Inc., Milwaukee, Wis.) and extracted for 2 hours with overhead stirring (Ika®-werke Eurostar power control-visc overhead stirrer, Ika Work Inc., Wilmington, N.C.) at room temperature. The hexane supernatant was separated by centrifugation at 3,500 g for 20 minutes, and the solid pellet recovered after decanting the hexane supernatant. The pellet was subsequently extracted using 425 g of MIBK (Aldrich Chemical Co. Inc., Milwaukee, Wis.) at room temperature with overhead stirring (Ika®-werke Eurostar power control-visc overhead stirrer, Ika Work Inc., Wilmington, N.C.) for 3 hours. The supernatant (solution of polymer in MIBK) was separated by centrifugation at 3,500 g for 20 minutes and the polymer precipitated by addition of 355 g of hexane. The precipitated polymer was recovered by filtration using a funnel lined with fluted filter paper (VWR Scientific Products, West Chester, Pa.) and dried overnight at 45° C. under vacuum of 1 mm Hg under vacuum in a Büichi rotavap to yield 13 gram of dried polymer. The dried polymer was subjected to hot film pressing at 180° C. A suitable amount of PHA (typically 0.5 gram) is placed between two PET sheets separated by shims to form a film of 100 micron thickness. The film assembly (i.e. two sheets, shims and PHA) was placed between the heated (180 ° C.) blocks of the press (Carver Hydraulic Press model #3912, Carver Inc., Wabash, Ind.) and a load of 10 tons was applied for 30 seconds. The film was then cooled between aluminum blocks and then inspected for color and clarity. This yielded a substantially clear film with substantially no fuming or objectionable odors at the operating temperature of 180° C. during the press cycle.

EXAMPLE VIII

The preceding example was repeated, except that heptane (Aldrich Chemical Co. Inc., Milwaukee, Wis.) was used rather than hexane. The processed yielded a substantially clear film with substantially no fuming or objectionable odors.

EXAMPLE IX

The preceding example was repeated, except that Soltrol® 100 (a mixture of $C_9$-$C_{11}$ isoalkanes, commercially available from Chevron Phillips Chemical Company located in Houston, Tex.) was used instead of hexane. The process yielded a substantially clear film with substantially no fuming or objectionable odors.

EXAMPLE X 100 g of wet *E. coli* biomass paste with 28% dry solids containing 75% Poly 3-hydroxybutyrate co 4-hydroxybutyrate with 35% 4-hydroxybutyrate on a dry solids basis was treated with an effective 0.02 N of NaOH (Aldrich Chemical Co. Inc., Milwaukee, Wis.) at 65° C. for 20 minutes and thereafter rapidly cooled to room temperature over 5 minutes. The resulting slurry was neutralized to pH of 7 using 85% phosphoric acid (Aldrich Chemical Co. Inc., Milwaukee, Wis.) and then centrifuged (3,500 g) for 20 minutes, and washed with two volumes of DI water. The supernatant was discarded and the paste extracted using 425 g of MIBK at room temperature with overhead stirring (Ika®-werke Eurostar power control-visc overhead stirrer, Ika Work Inc., Wilmington, N.C.) for three hours. The supernatant (solution of polymer in MIBK) was separated by centrifugation at 3,500 g for 20 minutes and the polymer precipitated by addition of 355 g of hexane. The precipitated polymer was recovered by filtration and dried under vacuum in a Büichi B-171 rotavap (65° C. and 1 mm Hg vacuum for 8 hours) to yield 12 gram of dried polymer. The dried polymer was subjected to hot film pressing at 180° C. This yielded a film with only very slight discoloration/opaqueness.

EXAMPLE XI

The preceding example was repeated, but without the steps of treating with NaOH at 65 ° C. for 20 minutes and rapid cooling. The PHA thus recovered yielded a film with strong yellow discoloration and opaqueness during the hot film press. There was also evidence of thermal degradation during the test as evidenced by fuming during the film test pressure cycle (180° C. and pressure of 10 tons of 30 seconds duration).

EXAMPLE XII

The following is an example of a one-stage process using a countercurrent centrifugal contacter.

11 kg of biomass paste containing 26% *E. coli* dry solids was contacted with 38.6 kg methyl isobutyl ketone (4-methyl 2-pentanone or MIBK) for three hours at 30° C. in a dissolution tank equipped with an agitator with marine impeller to maintain a homogeneous mixture. The biomass contained 71% by weight of poly-3-hydroxybutyrate co 4-hydroxybutyrate (22% molar 4-hydroxybutyrate) on a dry basis. After three hours the supernatant solution of MIBK and PHA obtained by centrifuging a sample from the dissolution tank contained 4.1% PHA by weight representing 91.2% dissolution.

The mixture of cell paste and MIBK was fed to an A-1 pilot scale Podbielniak extractor (B&P Process Equipment, Saginaw, Mich.) as the heavy liquid in (HLI) at a rate of 635 ml/min. At the same time fresh MIBK was fed as the light liquid in (LLI) to effect countercurrent washing and extraction of the cell paste within the Podbielniak contactor. The LLI was fed at a rate of 175 ml/min to maintain a feed ratio of HLI:LLI of 3.6:1. A total of 49.6 kg of HLI and 12.8 kg of LLI was fed over a 90 minute period. A total of 8.9 kg of residual cell paste was collected as the heavy liquid out (HLO) and 53.6 kg of PHA solution in MIBK was collected as the light liquid out (LLO) over the course of the 90 minute period. The LLO contained 3.75% by weight PHA in solution as determined by drying a sample of this material. A total of 2.0 kg PHA was recovered in the LLO compared to the 2.04 kg PHA contained in the HLI cell paste feed (98.4% overall recovery).

Mass balance measurements indicated that more than 98% of the total MIBK contained in the combined HLI and LLI was recovered in the clarified PHA in MIBK solution (LLO). Laboratory centrifugation indicated that a very clear interface was formed after 1 minute of centrifugation at 3000 g. The absence of any interfacial accumulation was also confirmed by the LLO remaining clear for the duration of the 90 minute trial.

The improved PHA recovery of the Podbielniak extractor (98.4%) compared to that achieved with a single stage of dissolution (91.2%) confirms the efficacy of countercurrent contacting with fresh solvent to improve PHA recovery. The residual biomass paste viscosity is also reduced dramatically by countercurrent contacting as a result of the nearly complete removal of the PHA

EXAMPLE XIII

The following is an example of PHA extraction using cyclo-hexanone.

90 g of wet *E. coli* biomass paste with 28% dry solids containing 80% poly 3-hydroxybutyrate co 4-hydroxybutyrate (PHA) with 12% 4-hydroxybutyrate on a dry solids basis was added to 400 g of cyclo-hexanone (Aldrich Chemical Co., Inc., Milwaukee, Wis.) at 90° C. The solution was homogenized for 5 minutes using a hand-held homogenizer equipped with a single slotted rotor stator combination at 30,000 rpm (Virtis, Gardiner, N.Y.) and then agitated for 30 minutes using an overhead stirrer (Ika®-werke Eurostar power control-visc overhead stirrer, Ika Work Inc., Wilmington, N.C.). The temperature was controlled at 90±5° C. during the solvent contacting step. The biomass paste/cyclo-hexanone mixture was then centrifuged at 3000 g for 5 minutes to separate the supernatant (solution of polymer in cyclo-hexanone) by decanting from the residual biomass paste pellet using a Sorvall RC 5B plus centrifuge (Kendro Laboratory Products, Newtown, Conn.).

The supernatant was then re-heated in a beaker to 80±5° C. and an equal volume of heptane (held at room temperature) was slowly added to the solution over the course of 5 minutes while mixing vigorously with an overhead stirrer (Ika®-werke Eurostar power control-visc overhead stirrer, Ika Work Inc., Wilmington, N.C.) to precipitate the polymer while maintaining the temperature between 70° C. and 80° C. The precipitated polymer was recovered by filtration using a funnel lined with fluted filter paper (VWR Scientific Products, West Chester, Pa.) and air dried overnight in a chemical fume hood to yield 16 g of white polymer granules (80% overall recovery).

A film was prepared by placing approximately 0.5 g of polymer between two PET sheets separated by shims to form a film of 100 micron thickness. The film assembly (i.e. two sheets, shims and PHA) was placed between the heated (180° C.) blocks of the press (Carver Hydraulic Press model #3912, Carver Inc., Wabash, Ind.) and a load of 10 tons was applied for 30 seconds. The film was then cooled between aluminum blocks and inspected for color and clarity. This yielded a substantially clear film with substantially no fuming or objectionable odors at the operating temperature of 180° C. during the press cycle.

EXAMPLE XIV

The following is an example of PHBH extraction.

Wet cell paste of *Ralstonia eutropha* (27% biomass solids on a weight basis in water) containing approximately 65% poly 3-hydroxybutyrate co 3-hydroxyhexanoate (PHBH) on a dry biomass basis with a composition of 5-7% hydroxyhexanoate on a molar basis (Kichise et. al., (1999), Intl. J. Biol. Macromol. 25: 69-77) was prepared using a genetically engineered *Ralstonia* strain prepared as described in (Kichise et. al., (1999), Intl. J. Biol. Macromol. 25: 69-77) and the fermentation process described by Naylor in U.S. Pat. No. 5,871,980 using fructose and lauric acid as carbon sources. This biomass was added to a suitable quantity of MIBK targeting a 5% solution (w/w) of PHBH in the solvent. The solution was homogenized for 5 minutes using a hand-held homogenizer equipped with a single slotted rotor stator combination at 30,000 rpm (Virtis, Gardiner, N.Y.) and then agitated for 30 minutes using an overhead stirrer (Ika®-werke Eurostar power control-visc overhead stirrer, Ika Work Inc., Wilmington, N.C.). The temperature was controlled at 80±5° C. during the solvent contacting step. The resulting biomass/solvent mixture was separated by centrifugation using a Sorvall RC 5B plus centrifuge (Kendro Laboratory Products, Newtown, Conn.). The biomass paste/cyclo-hexanone mixture was then centrifuged at 3000 g for 5 minutes to separate the supernatant (solution of polymer in cyclo-hexanone) by decanting from the residual biomass paste pellet.

The supernatant was added to a beaker and an equal volume of heptane was slowly added to the solution over the course of 5 minutes while mixing vigorously with an overhead stirrer (Ika®-werke Eurostar power control-visc overhead stirrer, Ika Work Inc., Wilmington, N.C.) to precipitate the polymer. A white crystalline polymer powder was recovered after overnight drying in a chemical fume hood.

EXAMPLE XV

The following is an example of PHBX extraction.

Wet cell paste of genetically engineered *Pseudomonas sp* was prepared and grown on glucose as described by Matsusakai et al., (1999, Biomacromolecules 1: 17-22) containing approximately 50% poly 3-hydroxybutyrate co 3-hydroxyoctanoate co 3-hydroxydecanoate co3-hydroxydodecanoate co 3-hydroxydodecenoate (PHBX) on a dry biomass basis with a composition of 92% 3-hydroxybutyrate, 1% 3-hydroxyoctanoate, 3% 3-hydroxydecanoate, 3% 3-hydroxydodecanoate and 1% 3-hydroxydodecenoate on a molar basis. This biomass was added to a suitable quantity of MIBK targeting a 5% solution (w/w) of PHBX in the solvent. The solution was homogenized for 5 minutes using a hand-held homogenizer equipped with a single slotted rotor stator combination at 30,000 rpm (Virtis, Gardiner, N.Y.) and then agitated for 30 minutes using an overhead stirrer (Ika®-werke Eurostar power control-visc overhead stirrer, Ika Work Inc., Wilmington, N.C.). The temperature was controlled at 80±5° C. during the solvent contacting step. The resulting biomass/solvent mixture was separated by centrifugation using a Sorvall RC 5B plus centrifuge (Kendro Laboratory Products, Newtown, Conn.). The biomass paste/cyclo-hexanone mixture was then centrifuged at 3000 g for 5 minutes to separate the supernatant (solution of polymer in cyclo-hexanone) by decanting from the residual biomass paste pellet.

The supernatant was added to a beaker and an equal volume of heptane was slowly added to the solution over the course of 5 minutes while mixing vigorously with an overhead stirrer (Ika®-werke Eurostar power control-visc overhead stirrer, Ika Work Inc., Wilmington, N.C.) to precipitate the polymer. A white crystalline polymer powder was recovered after overnight drying in a chemical fume hood.

Other embodiments are in the claims.

The invention claimed is:

1. A method of separating a polyhydroxyalkanoate polymer from biomass containing the polymer, the method comprising:
   contacting the biomass with a solvent system to provide a residual biomass and a solution including the polymer and the solvent system, the solution having a polymer concentration of at least about two percent and a viscosity of at most about 100 centipoise; and
   separating at least some of the solution from the residual biomass;
   wherein the solvent has a density of less than about 0.95 kilograms per liter.

2. The method of claim 1, wherein the solvent system comprises a non-halogenated solvent for the polymer.

3. The method of claim 1, wherein the solvent system comprises a solvent for the polymer that has a solubility in water of less than about one percent.

4. The method of claim 1, wherein the solvent system comprises a solvent for the polymer that is substantially non-hydrolyzable.

5. The method of claim 1, wherein the solvent system comprises a solvent for the polymer that has a log K value relative to water at 100° C. of at least about 1.5.

6. The method of claim 1, wherein the solvent system comprises a solvent for the polymer that has a boiling point greater than 100° C.

7. The method of claim 1, wherein the solvent system comprises at least one solvent selected from the group consisting of ketones, esters and alcohols.

8. The method of claim 1, wherein the solvent system comprises at least one solvent selected from the group consisting of MIBK, butyl acetate, cyclo-hexanone and combinations thereof.

9. The method of claim 1, wherein the solvent system comprises a precipitant for the polymer that dissolves less than about 0.2% of the polymer at room temperature.

10. The method of claim 1, wherein the solvent system comprises a solvent for the polymer and a precipitant for the polymer, the solvent for the polymer and the precipitant for the polymer having a relative volatility of at least about two at an equimolar bubble point for the solvent for the polymer and the precipitant for the polymer.

11. The method of claim 1, wherein the solvent system comprises a solvent for the polymer and a precipitant for the polymer, and the solvent for the polymer and the precipitant for the polymer do not form an azeotrope.

12. The method of claim 1, wherein the solvent system comprises a precipitant for the polymer that comprises an alkane.

13. The method of claim 1, wherein the biomass containing the polymer is of microbial origin and has a polymer content of at least about 50 weight percent.

14. The method of claim 1, wherein the biomass containing the polymer is of plant origin and has a polymer content of less than about 50 weight percent.

15. The method of claim 1, wherein the biomass containing the polymer comprises cells that contain the polymer.

16. The method of claim 1, further comprising removing at least some of the polymer from the solution.

17. The method of claim 16, further comprising extruding the removed polymer to dry and pelletize the polymer.

18. The method of claim 16, wherein removing the polymer from the solution does not include exposing the solution to hot water.

19. The method of claim 16, wherein removing the polymer from the solution includes adding a precipitant for the polymer to the solution.

20. The method of claim 16, further comprising evaporating a portion of the solution before removing at least some of the polymer from the solution.

21. The method of claim 1, wherein separating at least some of the solution from the residual biomass includes applying a centrifugal force to the solution and the residual biomass.

22. The method of claim 1, wherein the polymer comprises a PHA.

23. The method of claim 1, wherein the solvent system is contacted with the biomass under countercurrent flow conditions.

24. The method of claim 23, wherein the method is a one-stage method.

25. The method of claim 23, wherein the method is a multi-stage method.

26. The method of claim 23, wherein the countercurrent conditions include a pressure of at least about 65 psig.

* * * * *